United States Patent [19]
Bennett et al.

[11] Patent Number: 6,112,055
[45] Date of Patent: Aug. 29, 2000

[54] METHOD AND APPARATUS FOR CONSERVING POWER IN A PAGER

[75] Inventors: Steven J. Bennett, Coquitlam; Marlo Rene Gothe; Kenneth Lee, both of Vancouver, all of Canada

[73] Assignee: Glenayre Electronics, Inc., Charlotte, N.C.

[21] Appl. No.: 09/267,408

[22] Filed: Mar. 10, 1999

Related U.S. Application Data

[62] Division of application No. 09/185,286, Nov. 3, 1998.
[60] Provisional application No. 60/067,465, Dec. 4, 1997.

[51] Int. Cl.$^7$ .............................. H04B 7/00; H04Q 3/02; H04Q 9/14
[52] U.S. Cl. .......................................... 455/38.3; 455/343
[58] Field of Search .................................. 455/38.1, 38.3, 455/574, 343, 458, 426, 552, 553; 340/825.44

[56] References Cited

U.S. PATENT DOCUMENTS

| | | | |
|---|---|---|---|
| 5,089,813 | 2/1992 | DeLuca et al. | 340/825.44 |
| 5,423,057 | 6/1995 | Kuznicki et al. | 455/38.3 |
| 5,440,299 | 8/1995 | Schwendeman | 340/825.44 |

*Primary Examiner*—Nguyen Vo
*Attorney, Agent, or Firm*—Christensen O'Connor Johnson Kindness PLLC

[57] ABSTRACT

A paging protocol includes header synchronization and system information segments containing information that allows a pager to conserve power. These segments can indicate a schedule of transmissions, and the channels of other transmissions. The pager can use this information to reduce the time the pager is in a high-power mode. In addition, the addresses are ordered so that the pager can more quickly determine whether a page is addressed to that particular pager. Further, the pager can activate circuitry in a sequenced manner to reduce peak power usage. The transmissions on different channels are synchronized in an offset manner so that the pager can scan one channel and switch to a next channel and immediately receive the start of a frame. Still further, the pager can be configured to perform narrowing searches during the initial acquisition process, which are then widened if no active channels are detected. If, after the widened search, still no active channels are detected, it is assumed that the pager is no longer in the service area. The pager enters an extended low-power mode to conserve power until the pager is moved back into the service area. The paging system and the pager also monitor the time between pages addressed to that pager and decrease the frequency of searches when the pager receives few pages. The paging system appropriately schedules a page when, eventually, a caller sends a page to that pager.

9 Claims, 14 Drawing Sheets

METHOD AND APPARATUS FOR CONSERVING POWER IN A PAGER

CROSS-REFERENCED TO RELATED APPLICATONS

This application is a divisional of U.S. Application Ser. No. 09/185,286, filed Nov. 3, 1998, which claims the benefit of U.S. Provisional Application Ser. No. 60/067,465 filed Dec. 4, 1997 and is a divisional of U.S. patent application Ser. No. 09/185,286, filed on Nov. 3, 1998.

FIELD OF THE INVENTION

The present invention relates to paging systems and, more particularly, to pagers used in paging systems. Still more particularly, the present invention is related to methods and apparatus for conserving power in such pagers.

BACKGROUND

Paging service providers (hereinafter "providers") implement paging systems to provide brief messages to paging service subscribers (hereinafter "subscribers"). FIG. 1 is a simplified diagram illustrative of a paging system 10. Generally, a person (i.e., the caller) who wishes to contact the subscriber may call the subscriber's pager telephone number using telephone 11 and initiate a page containing a brief message that is broadcast to the subscriber. The telephone call is routed through the publicly switched telephone network (PSTN) 12 to a paging terminal (PT) 13. The caller can then initiate a page, which PT 13 then provides to a number of paging stations (PSs) $14_1$–$14_N$ to transmit the page in a broadcast fashion The paging system (PSs) $14_1$–$14_N$ to transmit the page in a broadcast fashion The paging system typically has a service area in which the subscriber can accurately receive the page. The subscriber then receives the page through a portable remote receiver unit (pager) 15, which receives pages and notifies the subscriber upon receipt of a page. Typically, a pager has a unique address that the pager searches for in the broadcasted pages to find pages intended for the subscriber. The subscriber would then generally keep the pager nearby during the times the subscriber wants to receive pages.

FIG. 2 is a block diagram illustrative of pager 15. Typically, pager 15 includes a battery 20 or other energy storage device to provide power to operate the circuitry of pager 15. A pager generally includes a central processing unit (CPU) 21 to execute software or firmware in operating the pager, a clock generator (CG) 22 to generate accurate clock signals used by CPU 21 and other circuitry, a memory 23 to store information, a display 24 (e.g., an LCD) to display alphanumeric messages, such as telephone numbers or short written messages), and a receiver 25 to receive pages broadcast by the paging system. Two-way pagers may include an input/output (I/O) device 26 (e.g., alphanumeric pushbuttons to input alphanumeric messages) and a transmitter 27 to send the message back to the PT 13. Digital voice pagers may include a voice synthesizer 28 or other conversion device used in converting a received voice page into an analog acoustic signal that the subscriber can hear. Two-way voice pagers may include a microphone for inputting voice messages to be transmitted back to the PT. Because battery 20 provides all of the power used by pager 15, power conservation becomes an important issue.

FIG. 3 is a diagram illustrative of cycle partitioning in an exemplary paging protocol. A paging protocol is typically partitioned into a number of cycles. As shown in FIG. 4, each cycle is partitioned into a number of frames. Typically, a frame would contain a batch of pages addressed to a large number of pagers. A frame would be partitioned into a number of segments, as shown in FIG. 5. A frame might start with a header synchronization (HS) segment, followed by a system information (SI) segment, followed by addresses and data. In particular, a first address (A1) and a first data (D1) portion would form a first page, while a second address (A2) and a second data (D2) portion would form a second page, and so on. In this type of partitioning, a pager would typically receive a large portion of the frame to determine if any of the addresses matched the address of that particular pager. If the pager finds its address in the group of received addresses, then the pager receives the corresponding data portion. It will be appreciated that the pager consumes a significant amount of power in receiving and processing these pages.

As mentioned above, reducing power consumption in a pager is an important concern because pagers are typically battery-powered and, thus, have a limited power supply. In addition to the power dissipated in receiving and processing pages, another significant source of power consumption in a pager is in initially "acquiring" a channel and a time slot in the channel. In acquisition, a pager generally has to scan through one or more channels for transmissions that the pager can recognize and then detect pages addressed to that particular pager. This process causes the pager to consume a relatively large amount of power. In addition, this process can be exacerbated in paging systems that use multiple protocols in a single channel and/or have several channels supporting a particular protocol. Further, the subscriber may travel out of the service area, which prevents the pager from detecting any recognized channels. Accordingly, there is a need for a paging system that reduces pager power dissipation in processing pages and acquiring channels.

SUMMARY

In accordance with the present invention, methods and apparatus for conserving power in a pager are provided. The transmissions are partitioned into cycles, which are partitioned into frames, which are partitioned into segments. Further, some of the segments are partitioned into address and data blocks. The address blocks include a number of addresses, and the data blocks include a number of data portions. An address and corresponding data portion form a page. In addition, the pager may be configured to receive transmissions over several channels.

In one aspect of the present invention, the pager includes circuitry to detect a header synchronization (HS) segment indicative of the protocol of the rest of the transmission. In a further refinement, the HS segment is generated to include frequency invariant signals so that the pager need not perform a frequency synchronization process, thereby saving power. The frequency invariant signals can be chirp signals that are essentially frequency invariant within the range of interest under all expected frequency offset conditions (e.g., Doppler shift in the channel and local oscillator free running inaccuracy in the pager receiver). Consequently, if the HS segment does not match the pager's protocol, the pager can quickly determine this condition and not receive the rest of the transmission, which also saves power.

In another aspect of the present invention, the pager receives a system information (SI) segment that contains information indicative of the schedule or time slot of transmissions with the same protocol as the SI segment's protocol. The pager can then enter a low-power mode between the expected transmission time slots to save power.

In still another aspect of the present invention, upon being switched on, the pager is configured to search the last channel and time slot that the pager used before being switched off. This scheme saves power because it is likely that the paging system will use the same channel to send pages to a particular pager. If no matching transmissions are detected, the pager then performs a normal channel acquisition process.

In yet another aspect of the present invention, the pager is configured to detect and store active channels (i.e., channels having transmissions according to the pager's protocol) in a memory. During subsequent reacquisition processes, the pager would search only the stored channels. The pager would initiate a normal initial acquisition process if the stored channels were no longer active.

In a further aspect of the present invention, the paging system is configured to transmit page addresses in descending order, with the segment number that the address was transmitted in representing the lower order bits of the address. Thus the address is transmitted using a smaller number of bits and requires less processing on the part of the pager. In addition, because the order of addresses is known, the pager can stop receiving addresses once an address that is lower than the pager's address has been received. In a further refinement, each segment can include the range of addresses that are being transmitted in the segment. If the pager's address is not within the range, the pager can immediately enter the low-power mode without receiving any more addresses from that segment. In still a further refinement, each segment can include the number of addresses that are being transmitted in the segment. If the number is zero, the pager can immediately enter the low-power mode. If the number is one or two, the pager can skip receiving the range of addresses and just receive the actual addresses.

In a still further aspect of the present invention, the pager is configured to receive and store an entire block of addresses, as opposed to receiving and processing the addresses as they are received. The pager then performs a binary search on the stored addresses to detect whether the pager's address is in the block. Because a binary search is significantly more efficient on average than searching each address, the pager saves power. In a further refinement, the circuitry of the pager can be powered on in sequence to reduce the peak power usage. Thus, the receiver circuitry is then powered down after the addresses and/or data are received and stored. Then the processing circuitry is powered on to process the stored addresses and/or data. The processing circuitry is then powered down before powering up the next subsystem, and so on. Reducing the peak power usage helps preserve battery life. In still a further refinement, the paging system will provide random data so as to achieve continuous transmission. In this manner, the pager will always detect an active channel during the reacquisition process (if in the service area), thereby avoiding the need to perform the more power-consuming initial acquisition process.

In yet a further aspect of the present invention, the pager is configured to increase the duration of the low-power mode after a search results in the detection of no active channels. In this case, it is assumed that the pager is out of the service area and thus will not be able to detect any active channels until the pager returns to the service area. Thus, by increasing the duration of the low-power mode between searches, the pager will perform fewer searches in a given amount of time, while giving the user time to return to the service area before powering up, thereby conserving power.

Still further, in another aspect of the present invention, the paging system is configured to synchronize transmissions of a particular protocol between channels in an offset manner. In particular, the transmissions are timed so that, after a pager scans one channel (e.g., receives the HS segment), the pager can switch to a next channel and immediately receive the HS segment of a frame without waiting. This scheme reduces the time the pager is in the normal receiving mode to receive a particular set of information between channels, thereby saving power.

In addition, in another aspect of the present invention, the pager performs a search process that is first narrowing so as to detect and monitor only active channels at a minimal search rate and search duration. If no active channels are detected, the pager starts expanding the search in stages to include other channels, longer search durations and/or more frequent time intervals. Then if no active channels are detected, the pager is assumed to be out of the service area, and the search process is slowed down.

Another aspect of the present invention is directed toward pagers that have light traffic. The pager monitors active channels and records the time of each received page addressed for that particular pager. If the pager does not receive a page after a predetermined time period, the pager increases the duration of the low-power mode by a predetermined amount of time. This scheme saves power for pagers that do not receive many pages. The paging system also keeps track of the last page to each pager so as to keep track of how long each pager will enter the low-power mode between periods of activity. The paging system can then appropriately schedule pages to each pager.

BRIEF DESCRIPTION OF THE DRAWINGS

The foregoing aspects and many of the attendant advantages of this invention will become more readily appreciated by reference to the following detailed description, when taken in conjunction with the accompanying drawings listed below.

DETAILED DESCRIPTION

Figure 6:
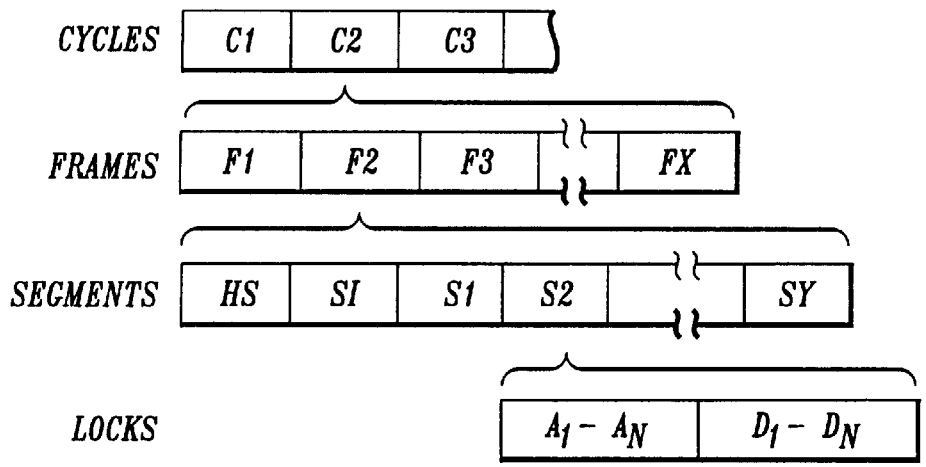
FIG. 6 is a diagram illustrative of segment ordering in a frame, according to one embodiment of the present invention.

FIG. 6 is a diagram illustrative of segment ordering in a frame, according to one embodiment of the present invention. In this embodiment, a frame is divided into a header synchronization (HS) segment, a system information (SI) segment, and segments $S_1$–$S_Y$. Each segment $S_i$ of segments $S_1$–$S_Y$ has an address block $A_i$ and a data block $D_i$, where Y represents an integer greater than or equal to one, and where i represents an integer between one and Y. Further, each pair of blocks $A_i$ and $D_i$ have up to N pages (i.e., N addresses and N corresponding data portions or subsegments), where N represents an integer greater than or equal to one. Segments $S_1$–$S_Y$ are sometimes referred to herein as page segments $S_1$–$S_Y$.

In one embodiment, a segment $S_i$ may be formed by an address block $A_i$ having addresses $A_{i1}$–$A_{iN}$ of 32 bits each, followed by a data block $D_i$ having data portions $D_{i1}$–$D_{iN}$ of up to 217 bits each. Further, in this embodiment a frame may have sixteen segments $S_i$, with sixteen pages in each segment (i.e., $1 \leq S_i, N \leq 16$). Thus, a frame in this embodiment may contain 256 pages. Grouping the addresses at the beginning of a segment $S_i$ allows the pager to conserve power because the pager can check all of the addresses in the address block of the segment without also having to receive the corresponding data portions in the corresponding data block $D_i$. If the pager does not detect its address, the pager does not need to receive the data portions and can enter a low-power mode to conserve power. It will be appreciated that in other embodiments, the address and data segments can have a different number of pages than described above for this embodiment. Likewise, different numbers of bits may be used for the addresses and data portions in other embodiments.

Figure 7:
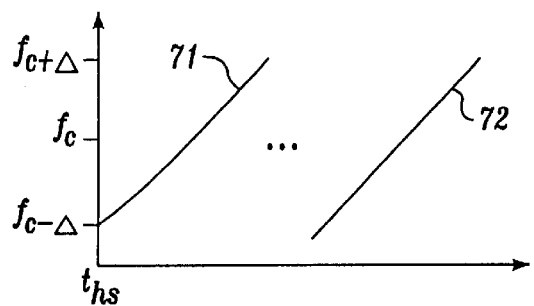
FIG. 7 is a diagram illustrative of a signal used to indicate a header synchronization (HS) segment, according to one embodiment of the present invention.

FIG. 7 is a diagram illustrative of a signal used in an HS segment, according to one embodiment of the present invention. Ideally, the signal used in the HS segment is frequency invariant in the frequency range of interest under the previously described frequency offset conditions expected for typical paging applications. In this embodiment, the HS signal is generated as a pattern of signals having their frequencies swept as a function of time (sometimes referred to as chirps). Curve 71 in FIG. 7 illustrates a chirp starting at the start of the HS segment (i.e., $t_{hs}$) with an approximately linear increase in frequency, from frequency $f_{C-\Delta}$ to frequency $f_{C+\Delta}$ where $f_C$ is the center frequency of a channel. In one embodiment, $\Delta$ is equal to about 8900 Hz, so that the chirp stays within the out-of-channel noise limits set by government regulations. A subsequent chirp 72 begins after chirp 71 in a substantially identical manner. In one embodiment, the HS segment includes fifty chirps. In other embodiments, a different number of chirps may be used to generate an HS segment, or different chirp formats (e.g., nonlinear frequency sweeps or decreasing frequency sweeps) or combinations of chirp formats may be used to generate an HS segment. This type of header synchronization may not be part of the normal modulation symbol constellation (e.g., 16 QAM, etc.) and appears invariant with respect to the frequency offset caused by Doppler shift in the channel and local oscillator free running inaccuracy in the pager receiver.

Figure 1:
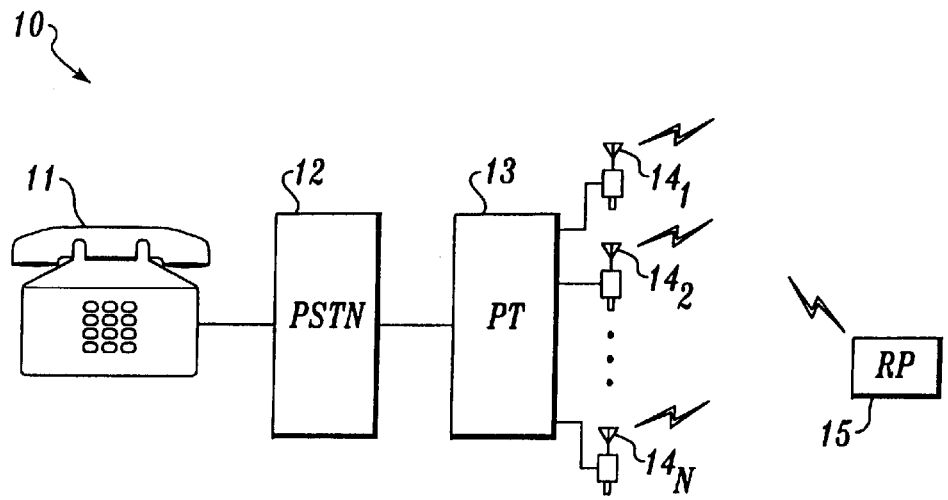
FIG. 1 is a simplified diagram illustrative of a paging system.

In another embodiment, other symbol patterns may be chosen that use constellation points in the complex domain (can be the constellation points of the modulation scheme, but this is not required) to achieve the same frequency-invariant characteristic as chirp patterns. That is, patterns other than chirps may be used, provided they are substantially frequency invariant with respect to frequency offset in the channel or receiver's local oscillator. Consequently, the pager need not be synchronized with the carrier frequency of the PSs (see FIG. 1). Because the frequency synchronization process requires time and processing, this chirp HS technique allows the pager to conserve power. One embodiment of this HS detection scheme is disclosed in more detail in co-pending and commonly assigned U.S. patent application Ser. No. 09/086,794, titled "Header Synchronization Detector."

Figure 2:
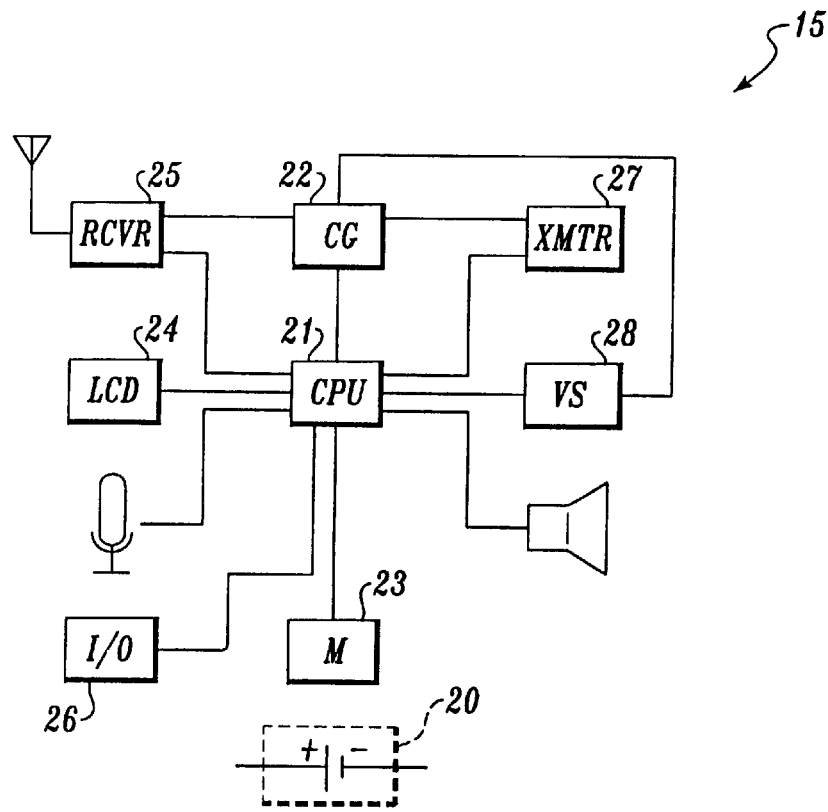
FIG. 2 is a block diagram illustrative of a pager.
Figure 3:
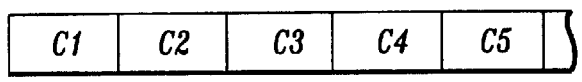
FIG. 3 is a diagram illustrative of cycle partitioning in a paging protocol.
Figure 4:
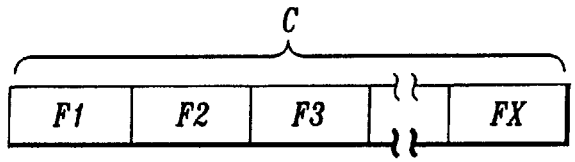
FIG. 4 is a diagram illustrative of frame partitioning of a cycle.
Figure 5:
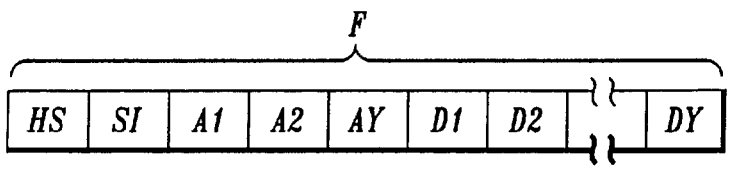
FIG. 5 is a diagram illustrative of address and data partitioning of a frame.
Figure 8:
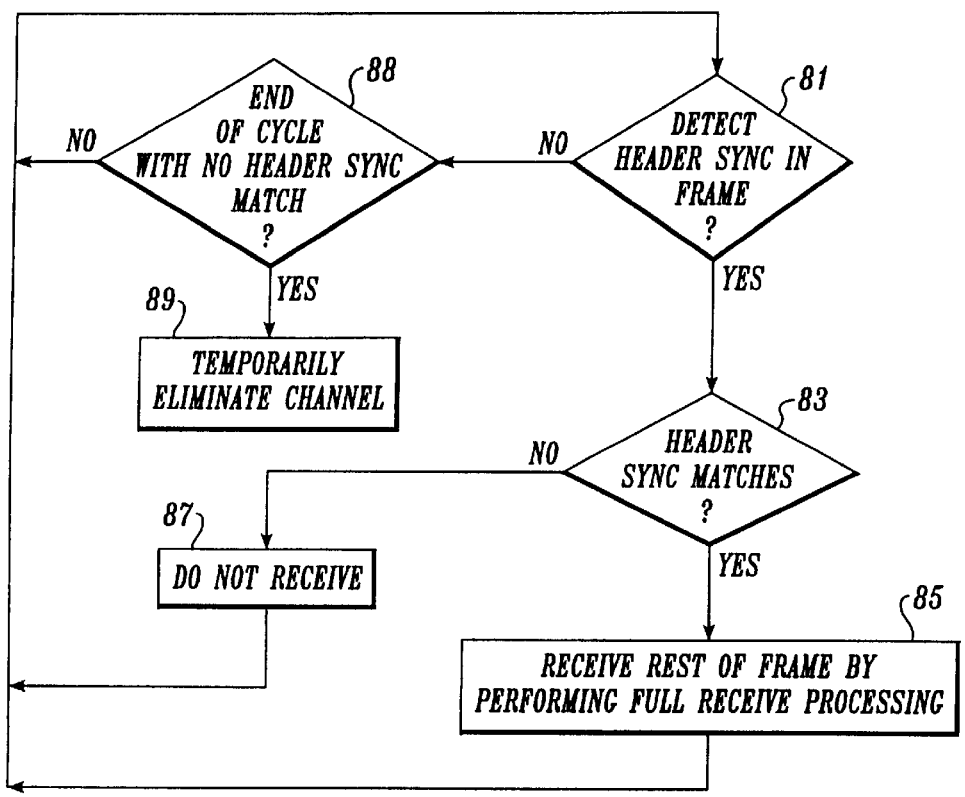
FIG. 8 is a flow diagram illustrative of a pager using a received HS segment in channel acquisition, according to one embodiment of the present invention.

FIG. 8 is a flow diagram illustrative of a pager (not shown) using a received HS to acquire a channel, according to one embodiment of the present invention. In light of this disclosure, those skilled in the art of pagers can implement without undue experimentation a computer program that the pager will execute to perform the process illustrated in FIG. 8. In this embodiment, the pager is similar to pager 15 (FIG. 2) except that the pager is configured to receive and process HS chirps.

In a step 81, the pager monitors a channel for an HS portion of the protocol. Once an HS portion containing chirps is detected, in a step 83 the pager determines whether the received HS corresponds to the paging protocol that the pager is configured to receive. If the received HS matches the pager's protocol, the pager performs a step 85 in which the pager receives the rest of the frame. However, if in step 83 the received HS does not match the pager's protocol, the pager does not demodulate the frame. By not demodulating the frame, the pager conserves power by avoiding the need to operate the synchronization and demodulation circuitry of its receiver. The pager then returns to step 81 to monitor the next frame.

Returning to step 81, if the pager does not detect an HS matching the pager's protocol, in a step 88 the pager checks whether an entire cycle had been monitored without detecting a matching HS. If no matching HS was detected within an entire cycle of the channel, the pager can then eliminate the channel from future reacquisition processes because, in normal operation, if the channel was configured to support multiple protocols including the pager's protocol, the paging system would send at least one frame of the protocol per cycle.

Figure 9:
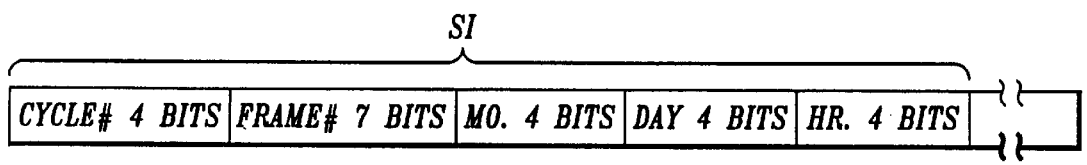
FIG. 9 is a diagram illustrative of system information (SI) partitioning, according to one embodiment of the present invention.

FIG. 9 is a diagram illustrative of system information (SI) partitioning, according to one embodiment of the present invention. In this embodiment, the SI segment contains information regarding which protocol or protocols are supported by the particular channel, and the time or times within each cycle that transmissions for each protocol are scheduled. The times of the transmissions can be provided indirectly by listing the frames or ranges of frames that will be transmitted according to a given protocol.

In another embodiment, the SI segment includes information regarding the current cycle, frame number, date, and time. For example, in one embodiment: the first four bits of the SI segment indicate the current cycle number; the next seven bits indicate the frame number; the next four bits represent the month; the next six bits represent the day; and the next six bits represent the hour. The minute and second values can be determined from the cycle and frame values. The information contained in the SI segment can be used by the pager as described below in conjunction with FIG. 10. The SI segment includes other information in addition to the information described, but this other information is omitted for clarity as not being germane to the invention. Of course, in other embodiments, different numbers of bits may be used to provide the cycle, frame, date, or time information.

Figure 10:
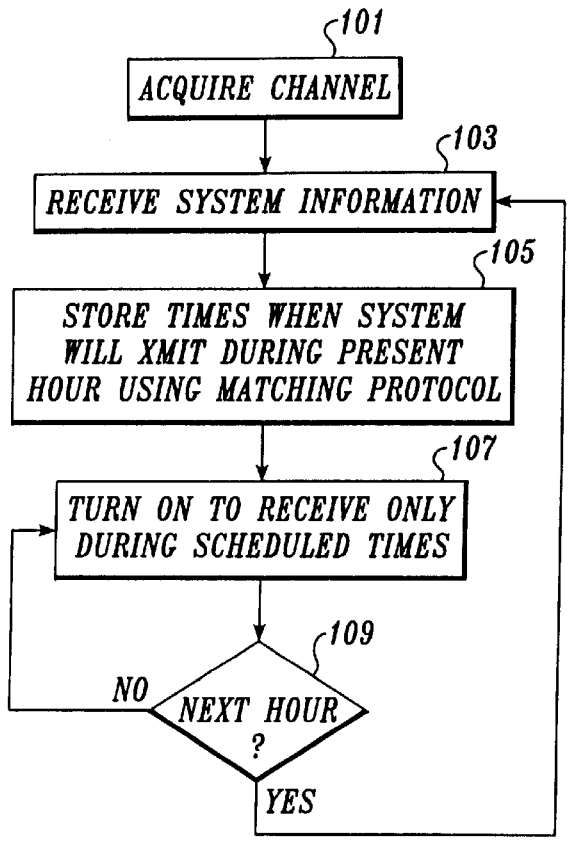
FIG. 10 is a flow diagram illustrative of a pager using a received SI segment in channel acquisition, according to one embodiment of the present invention.

FIG. 10 is a flow diagram illustrative of a pager using a received SI segment in channel acquisition, according to one embodiment of the present invention. In a step 101, the pager begins monitoring a specific transmission channel. After determining that the channel does support transmissions in the pager's protocol (e.g., using the HS segment), the pager performs the frequency synchronization process. Then, in a step 103, the pager receives and processes the SI segment to extract the system information. In a next step 105, the pager stores in a memory corresponding to memory 23 (FIG. 2) the times scheduled for matching protocol transmissions. Because the pager now "knows" when to expect transmissions in the pager's protocol, the pager can perform a step 107 and power up to receive transmissions only at the scheduled times. This scheme helps minimize the time that the pager is actually powering its receiver circuitry, thereby saving power.

Moreover, in a further refinement of this embodiment, the schedule of transmission times may include the schedule of transmissions for an entire hour. In this refinement, the pager may then receive a SI segment at the beginning of each hour to update the stored schedule of transmission times. A two-way pager may be required to check the SI segment immediately prior to transmitting to ensure that the pager has up-to-date system timing that will help the pager avoid interfering with transmissions from other two-way pagers.

In yet another refinement, the SI segment may include information indicating additional channels that the paging system may be using to transmit pages with the same protocol as the currently received SI segment. The pager would then store the channels and limit future channel acquisitions and reacquisitions to these stored channels, which allows the pager to avoid consuming power in searching channels that the paging system does not use to transmit pages with the pager's protocol.

Figure 11:
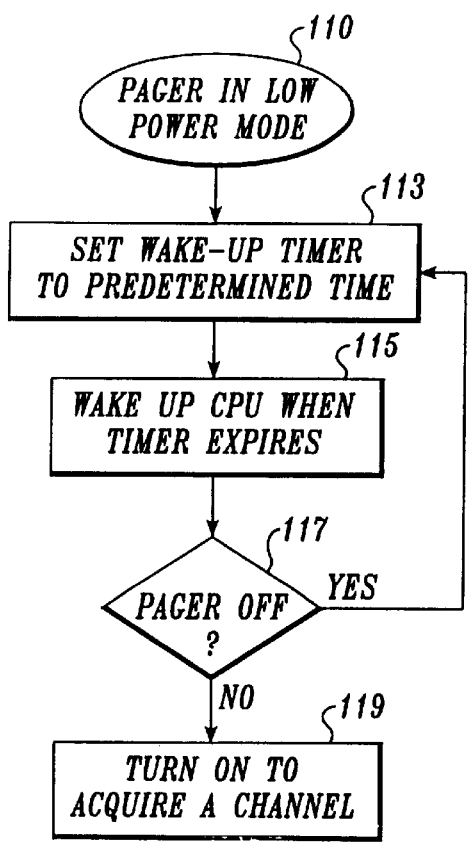
FIG. 11 is a flow diagram illustrative of a pager operating in a channel acquisition process, according to another embodiment of the present invention.

FIG. 11 is a flow diagram illustrative of a pager performing a channel acquisition process, according to another embodiment of the present invention. In this alternative embodiment, when switched on, the pager is configured to "wake up" from the low-power mode at predetermined intervals and then attempt to acquire a channel. More specifically, the pager has at least a normal-power mode and a low-power mode. In the normal-power mode, the pager provides power to all of the operating circuitry as needed for activities such as receiving, processing, and transmitting (in two-way pagers) paging signals. In contrast, the pager powers down most of the pager's circuitry in the low-power mode. Typically, the pager's timing and control circuits (e.g., a clock generator) remain powered, while the other circuitry, such as the receiver, volatile memory, transmitter, etc., are powered down. In this embodiment, the CPU includes a model H8 processor, available from Hitachi, which also has a low-power mode. Of course, any suitable microprocessor or microcontroller may be used in other embodiments.

Referring to FIG. 11, after the pager enters the low-power mode in a step 110, the pager resets a wake-up timer with the predetermined time in a step 113. The pager includes a continuous clock generator so that the wake-up timer operates while the pager is in the low-power mode. Preferably, the clock generator has an accuracy of about three ppm. Then in a step 115, the expiration of the timer causes the pager's CPU to enter the normal-power mode at the predetermined time. In a step 117, the pager determines whether the user has switched the pager off. If the pager is switched off, the pager returns to step 113 and resets the wake-up timer without powering up the pager's receiver circuitry. However, if the pager has not been switched off, the pager performs a channel acquisition process during a step 119. Alternatively, the pager may attempt a channel reacquisition process, as described below in conjunction with FIGS. 12 and 13.

Figure 12:
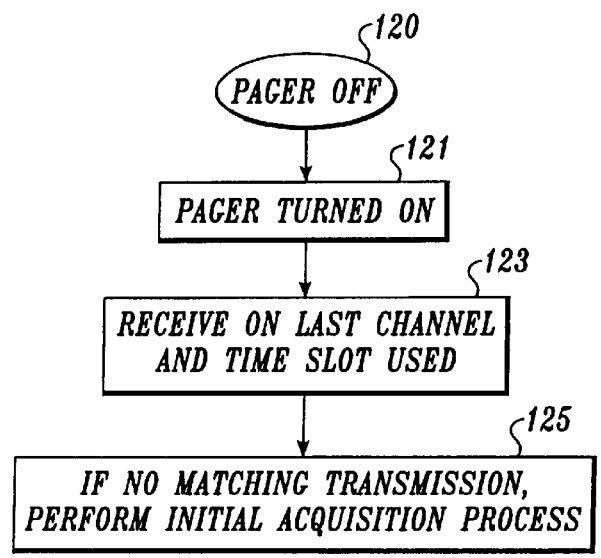
FIG. 12 is a flow diagram illustrative of a pager operating in a reacquisition process, according to one embodiment of the present invention.

FIG. 12 is a flow diagram illustrative of a pager operating in a reacquisition process after being turned off, according to one embodiment of the present invention. The pager enters an off state 120 after being switched off by the subscriber or user. For example, the subscriber may switch off the pager when the subscriber will not be carrying the pager or does not wish to be disturbed with a page. In this embodiment, the pager includes a nonvolatile memory (e.g., an EEPROM) in which the pager stores the channel and time slot of the pager's last reception.

When the subscriber again wishes to receive pages, in a next step 121, the subscriber turns on the pager. In a step 123, the pager attempts to receive transmissions using the channel and time slot last used to receive a transmission. The pager retrieves this channel and time slot information from the nonvolatile memory. However, if the pager does not detect any matching transmissions (i.e., transmissions using the pager's protocol), the pager then performs an initial channel acquisition process, such as described above in conjunction with FIG. 8. Alternatively, the pager may make a predetermined number of attempts to detect matching transmissions before performing step 125. This alternative embodiment is useful in cases where the pager is temporarily located in a poor reception area (e.g., due to geography, buildings, etc.). Then, when the subscriber changes locations, the pager may receive transmissions in one of the later attempts.

Figure 13:
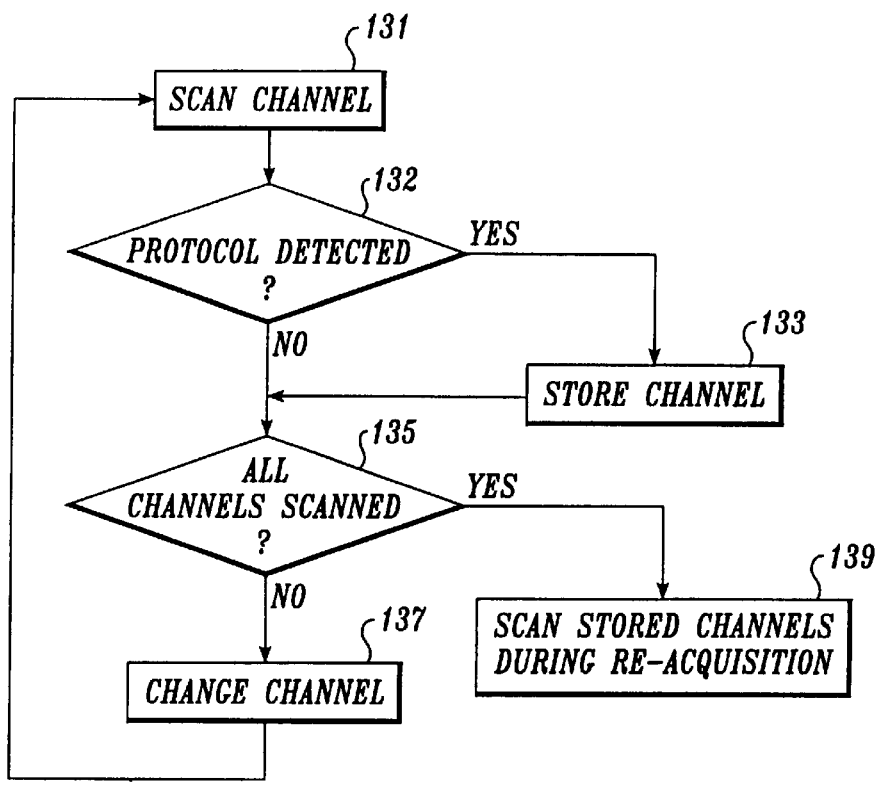
FIG. 13 is a flow diagram illustrative of a pager operating in a reacquisition process, according to another embodiment of the present invention.

FIG. 13 is a flow diagram illustrative of a pager performing initial acquisition, according to one embodiment of the present invention. This embodiment can be advantageously used in paging systems that can transmit pages of a single protocol over several channels. In a step 131, the pager tunes in and scans a channel to detect whether there are any transmissions with the pager's protocol. In one embodiment, the pager monitors a channel for a frame length. In this scheme, the pager is assured of receiving at least an HS and a SI segment, as described above in conjunction with FIG. 6. Thus, the pager will receive information of the protocol being used. In embodiments in which the HS and SI segments do not provide such information, the pager may monitor a channel for an entire cycle to detect whether the pager's protocol is used on that channel.

In a next step 132, if the protocol is detected in a transmission, the pager then stores information identifying the channel in a memory. Preferably, the pager stores this information in a nonvolatile memory so that the channel information is retained when the pager is shut off or enters the low-power mode. However, if the protocol is not detected in the channel, the pager does not store the channel information.

In a next step 135, the pager then determines whether all of the channels that the pager can receive have been scanned. If not, the pager performs a step 137 to change to a next unscanned channel. The pager then returns to step 131. In this manner, all of the channels that the pager can receive are scanned, and the particular channels that are used to transmit pages with the pager's protocol are stored. Then as shown in a step 139, during subsequent reacquisition processes the pager searches only the recorded channels, thereby saving power by not searching "unused" channels.

Figure 14:
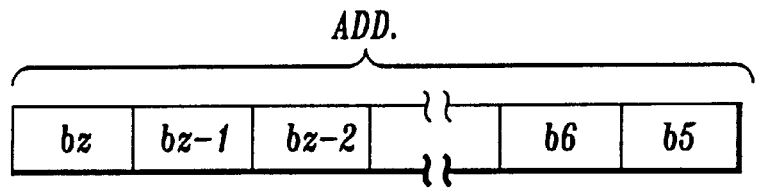
FIG. 14 is a diagram illustrative of a pager address, according to one embodiment of the present invention.

FIG. 14 is a diagram illustrative of a pager address, according to one embodiment of the present invention. In this embodiment, the paging system uses a unique z-bit address for each pager, where z represents an integer greater than four. However, the lower four bits are not included in the transmitted address because the segment (i.e., S1 through SY in FIG. 6) of the frame defines these lower order bits. That is, when Y is sixteen, the segment in which the address is transmitted implies the lower four bits of each address. Accordingly, a pager can be configured to receive only during the segment corresponding to the lower four bits of the pager's address. Thus, the pager can save power by not receiving or processing the addresses transmitted in non-corresponding segments.

Alternatively, the segment number (i.e., the segment in which the address was transmitted) can be used to imply any group of bits. For example, the segment number can be used to define the most significant M bits of the addresses in that particular segment, where Y is equivalent to $2^M$. Still further, those skilled in the art will appreciate that Y need not be a power of two, as long a M is selected so that Y can be represented in binary form with M bits.

Figure 15:
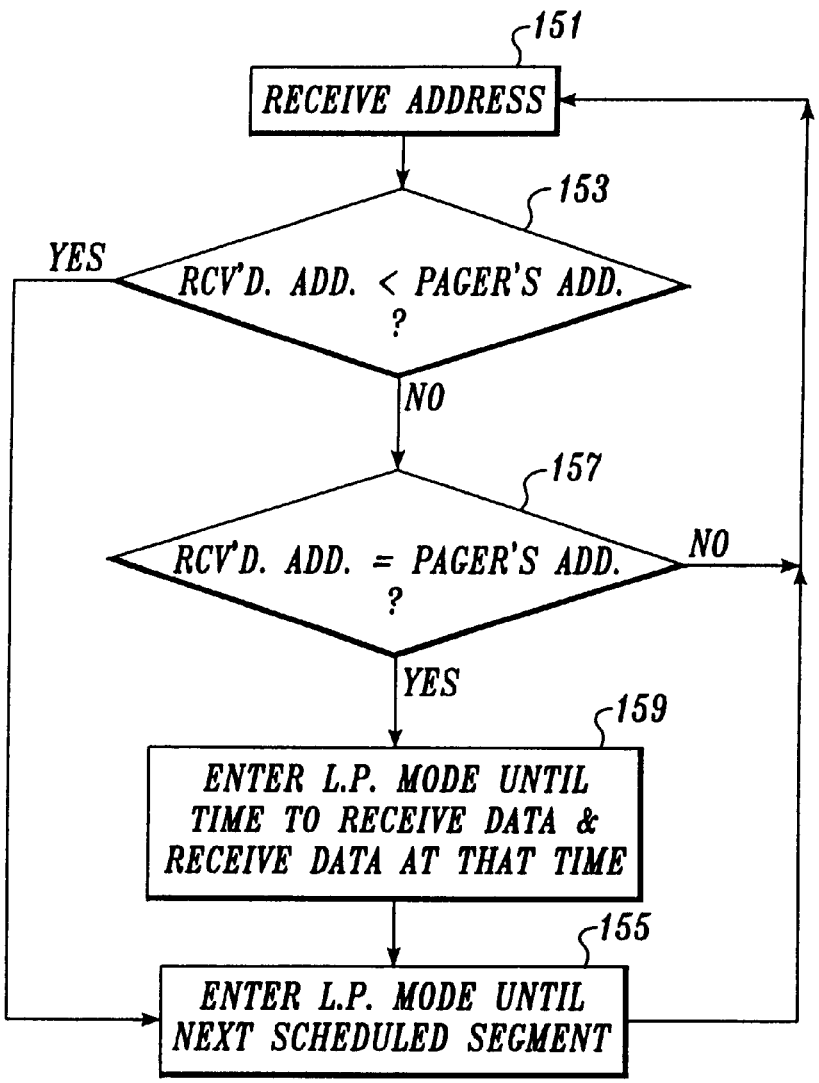
FIG. 15 is a flow diagram illustrative of a pager in receiving an address block, according to one embodiment of the present invention.

FIG. 15 is a flow diagram illustrative of a pager in receiving an address block of a segment, according to one embodiment of the present invention. In this embodiment, the paging system transmits addresses in decreasing order within a segment. In a step 151, the pager receives an address. Then in a next step 153, the pager compares the received address with the pager's address. Because the paging system sends addresses in decreasing order, if the received address is less than the pager's address, then none of the subsequent addresses in the segment and frame can correspond to this particular pager. Consequently, if the received address is lower than the pager's address, the pager performs a step 155 during which the pager enters the low-power mode. In this embodiment, the pager is configured to store the times of when the next segments will be transmitted with the pager's protocol (described above in conjunction with FIG. 10). The pager saves power by staying in the low-power mode until the next segment with the pager's protocol will be transmitted. After performing step 155, the pager then returns to step 151 to receive the next address segment.

On the other hand, if the received address is not less than the pager's address, the pager determines whether the received address is equal to the pager's address in a step 157. If the address is not equal to the pager's address, then the received address will be greater than the pager's address. Consequently, a subsequent address may match the pager's address, so the pager returns to step 151.

If the received address matches the pager's address, the pager performs a step 159 during which the pager enters a low-power mode until the corresponding data block is transmitted, thereby saving power. More particularly, in one embodiment the address block includes information indicating when the corresponding data will be transmitted. The pager then wakes up at the appropriate time to receive the corresponding data. After receiving the corresponding data, the pager then performs step 155 to enter the low-power mode until the next scheduled segment is to be received.

Figure 16:
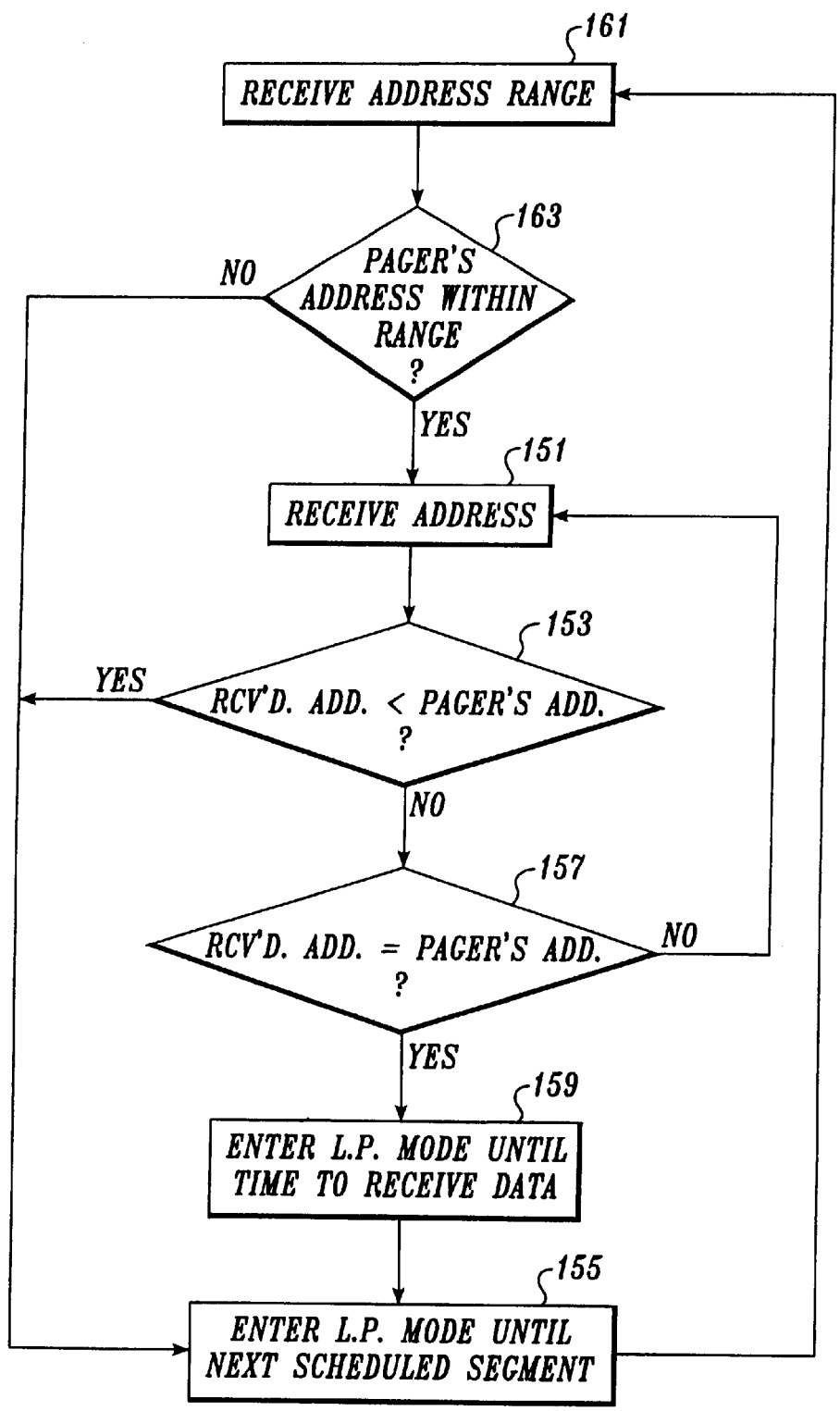
FIG. 16 is a flow diagram illustrative of a pager in receiving an address block, according to another embodiment of the present invention.

FIG. 16 is a flow diagram illustrative of a pager receiving an address segment, according to another embodiment of the present invention. This embodiment is substantially similar to the embodiment of FIG. 15, but includes additional steps 161 and 163. Prior to performing step 151 as described above in conjunction with FIG. 15, in step 161 the pager receives the range of addresses, which is included in the address segment. In particular for this embodiment, the smallest address and the largest address for the pages to be transmitted in the current frame are provided in a range section of the address segment.

In a step 163, the pager determines whether the pager's address is within the range of addresses. If not, the pager proceeds to step 155. After performing step 155, the pager returns to step 161 (instead of step 151 as in the embodiment of FIG. 15). Otherwise in this embodiment, the pager performs steps 151–159 (odd), as described above in conjunction with FIG. 15.

Figure 17:
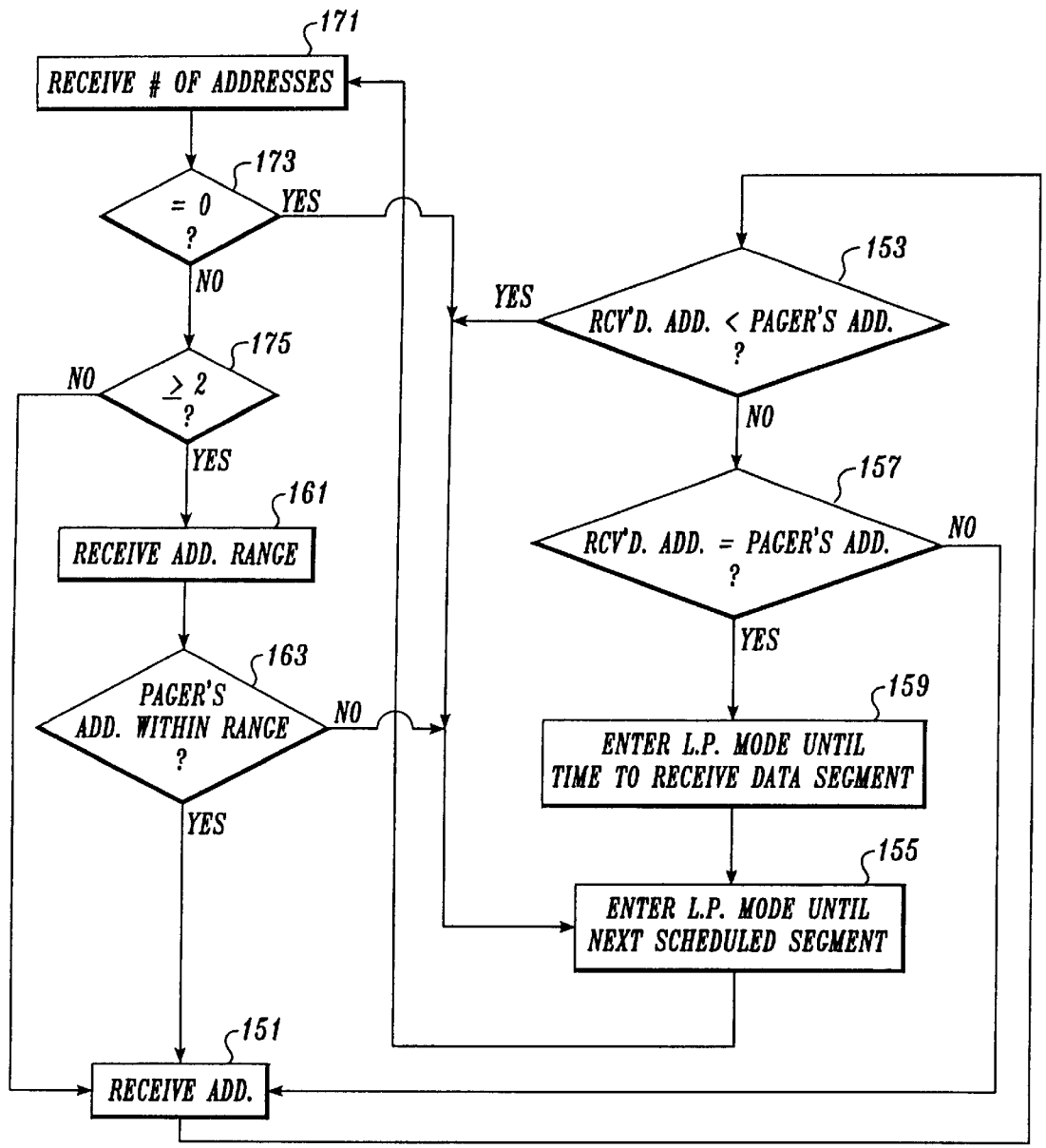
FIG. 17 is a flow diagram illustrative of a pager in receiving an address block, according to yet another embodiment of the present invention.

FIG. 17 is a flow diagram illustrative of a pager in receiving an address block of a segment, according to yet another embodiment of the present invention. This embodiment is substantially similar to the embodiment of FIG. 16, but includes additional steps 171, 173, and 175. Prior to performing step 161, as described above in conjunction with FIG. 16, the pager performs step 171 during which the pager receives the number of addresses to be transmitted in the current segment. In this embodiment, the number of addresses to be transmitted in the segment is included in the address block of the segment.

In step 173, the pager determines whether the number of addresses is zero. If there are no addresses, the pager then performs step 155 (as described above). After performing step 155, the pager returns to step 171 (instead of step 161 as in the embodiment of FIG. 16). However, if the number of addresses is not zero, in step 175 the pager determines whether the number of addresses is greater than or equal to two. If not (i.e., either one or two), the pager proceeds to steps 151–159 (odd) to receive and process the addresses. More particularly, the pager skips receiving the range because receiving one or two addresses has about the same efficiency as receiving the address range. Further, to save power, the paging system may dispense with transmitting the address range if only one or two addresses are to be transmitted.

If the number of addresses is greater than two, then the pager proceeds to step 161. Except for returning to step 171 from step 155, the pager performs steps 161, 163, and 151–159 (odd), as described above in conjunction with FIG. 16. Although the embodiments of FIGS. 15–17 are for paging systems' addresses transmitted in decreasing order, in light of this disclosure, those skilled in the art of paging systems can modify these embodiments without undue experimentation for use with paging systems that broadcast the addresses in increasing order.

Figure 18:
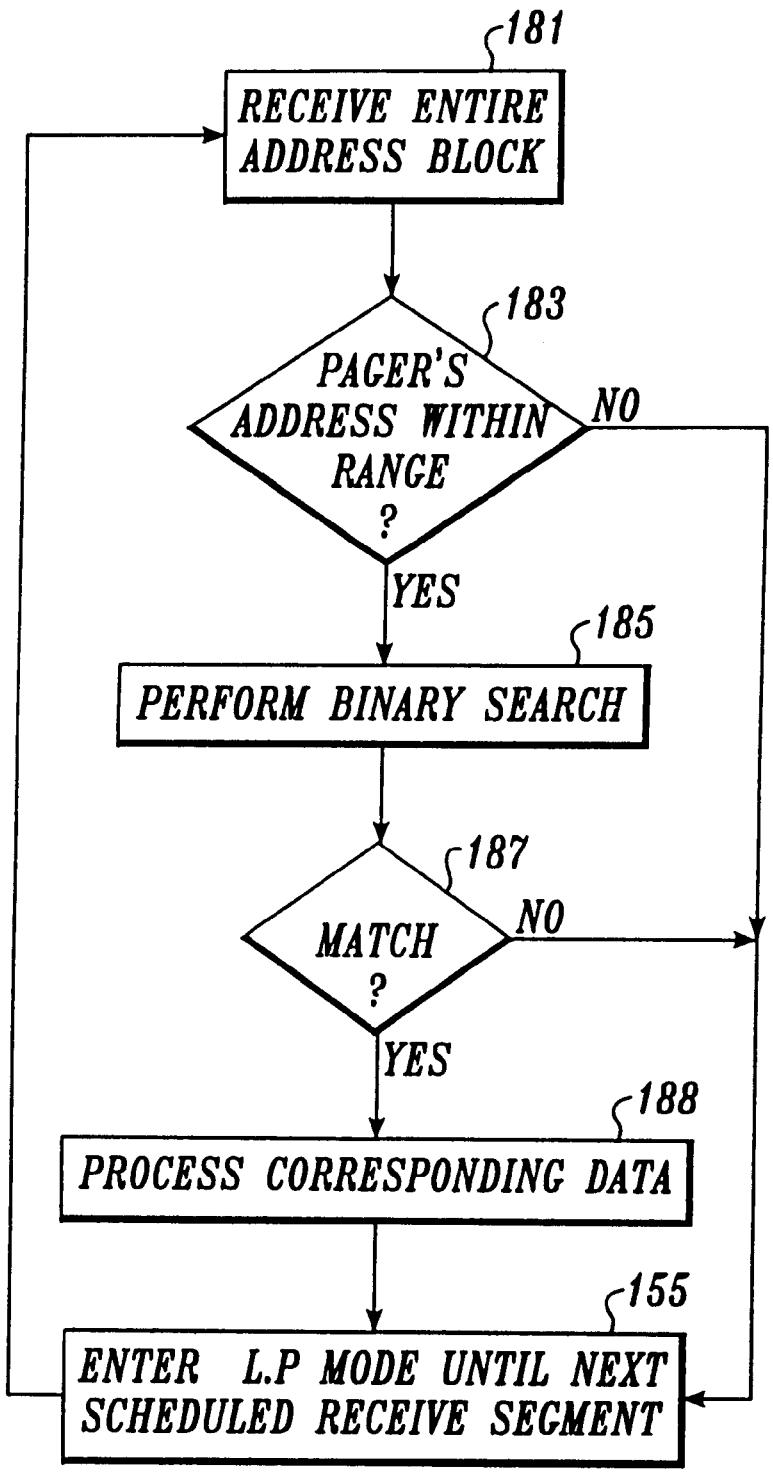
FIG. 18 is a flow diagram illustrative of a pager in processing addresses, according to one embodiment of the present invention.

FIG. 18 is a flow diagram illustrative of a pager in processing addresses, according to one embodiment of the present invention. In this embodiment, for each segment, the paging system broadcasts an address block followed by a corresponding data block (see, e.g., FIG. 6). The addresses are in decreasing order in the address block. In a step 181, the pager receives the entire block of addresses and stores the block in a memory. In a next step 183, the pager determines whether the pager's address is within the range of addresses of the received block. The address range can be determined from either (i) the first and last address information in the address block or (ii) by comparing the pager's address with the first and last addresses of the actual received address block. If the pager's address is not within the address range, the pager jumps to step 155 (as described above in conjunction with FIG. 15).

However, if the pager's address is within the address range, the pager executes a binary search algorithm in a next step 183. For example, the pager would first compare the pager's address with the address in the middle of the received address block. If the pager's address is lower, then the pager's address would be in the lower half of the received address block if that particular pager is addressed at all. The pager compares the pager's address to the middle address of the lower half, thereby cutting the remaining block of addresses in half again. This process continues until the pager's address matches one of the received addresses or is outside of the range of the remaining block. The binary search ensures that the maximum number of address comparisons is limited to n, where n represents an integer greater than one and where the number of addresses is between $2^{n-1}$ and $2^n$. This scheme saves power because the address block is searched efficiently.

Figure 19:
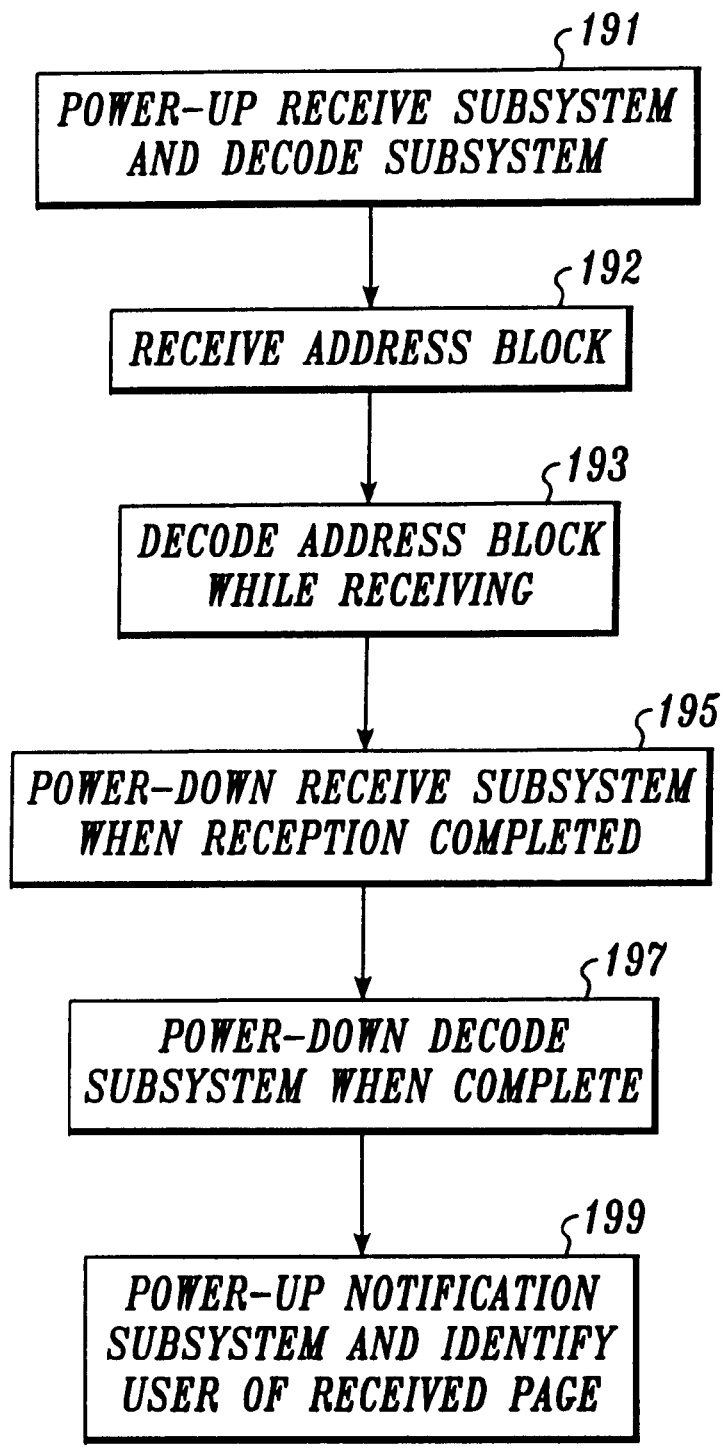
FIG. 19 is a flow diagram illustrative of a pager performing power sequencing, according to one embodiment of the present invention.

FIG. 19 is a flow diagram illustrative of a pager performing power sequencing, according to one embodiment of the present invention. In this embodiment, the pager is implemented so that circuitry can be independently powered on and off. For example, the receiver, transmitter, volatile memory, or voice synthesizer of a pager may be independently turned on and off. In this way, the pager can selectively turn on only those circuits that are being used. This scheme reduces peak power usage, thereby increasing the life of the pager's battery. More particularly, as is well known in the art, decreasing the peak power usage tends to increase the life of the battery.

Referring to FIG. 19, in a step 191, the pager powers up the pager's receive subsystem in preparation to receive an address block as described in conjunction with FIG. 18. In a step 192, the pager receives the address block and stores the addresses in a memory. In a step 193, the pager begins decoding the address block being received in step 192. In this embodiment, decoding refers to processing of the address block to extract the addresses and data pointers in the address block. Step 193 is performed concurrently with receiving the address block in step 192, although in other embodiments the decoding may be performed after the entire block of addresses has been received.

When the entire block is received, the pager powers down the receiver subsystem in a step 195 while continuing to decode the stored address block. By "spreading out" the power usage, the duration and/or level of peak or maximum power usage is reduced, thereby conserving battery life. When the decode process is complete, the pager powers down the decode subsystem in a step 197. Then in a step 199, the pager powers up the notification subsystem (i.e., the circuitry that generates a signal or indication, such as a sound or vibration) and signals the subscriber that the subscriber has received a page.

Similarly, a two-way pager may sequentially power up subsystems in transmitting a message. For example, the pager may first power up the input subsystem (e.g., a keypad) that allows the user to enter numeric or alphanumeric data into a memory. Then the pager may power down the input subsystem while powering up a message processing subsystem that processes the input data into the proper format and protocol for transmission. Then the pager may power down the message processing subsystem while powering up the transmitter subsystem to broadcast the message. By sequencing the powering up and powering down of the various subsystems of the pager, peak power usage is reduced, thereby prolonging battery life.

Figure 20:
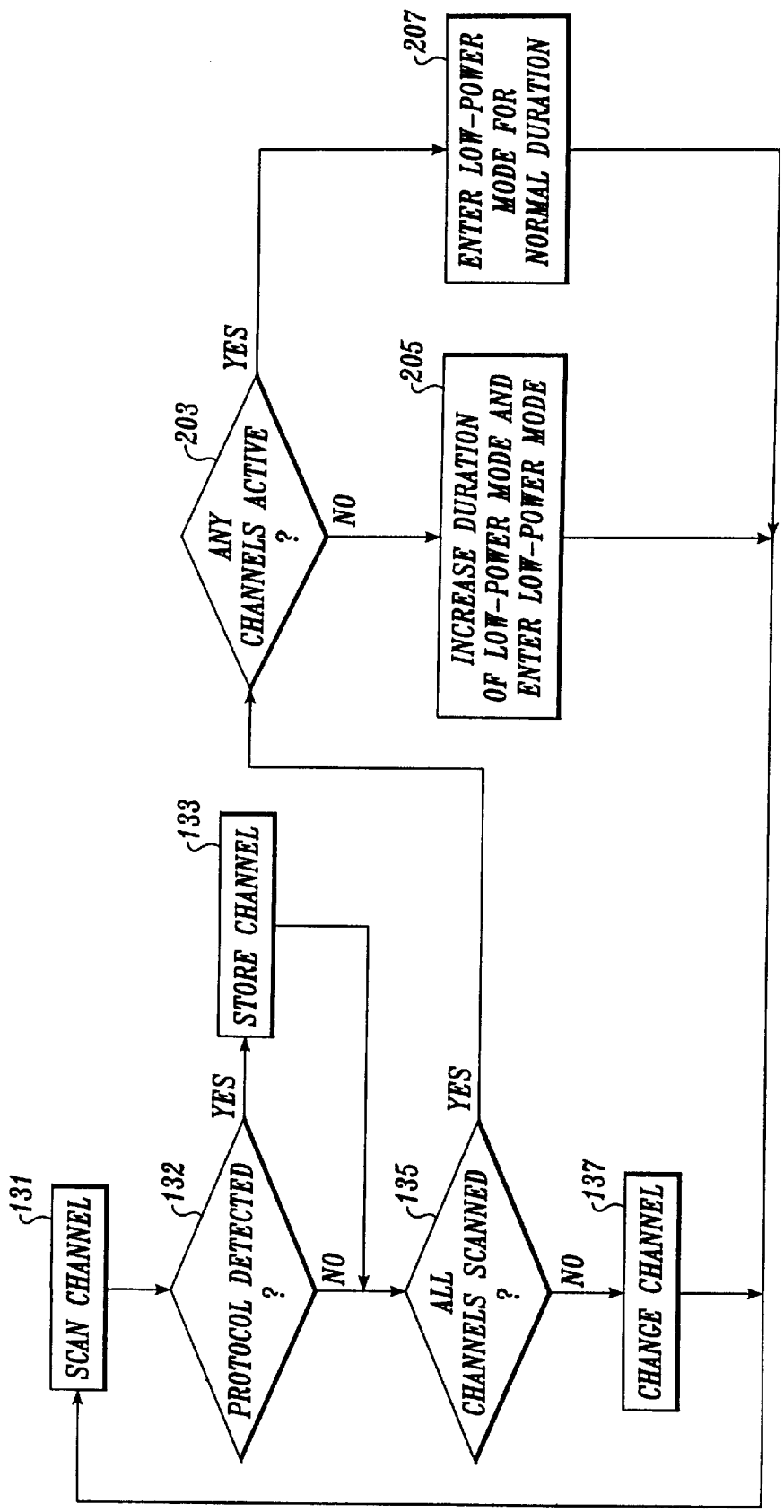
FIG. 20 is a flow diagram illustrative of a pager in scheduling search times, according to one embodiment of the present invention.

FIG. 20 is a flow diagram illustrative of a pager in scheduling search times, according to one embodiment of the present invention. One of the situations that can arise with pagers is that the subscriber temporarily moves out of the paging system's coverage area. In this situation, the pager generally will not be able to detect any transmissions with the pager's protocol. However, conventional pagers are typically configured to continue searching for "active" channels (i.e., channels having transmissions with the pager's protocol) even if the pager is located out of the service area, thereby consuming power without need.

Referring to FIG. 20, the pager performs steps 131–137 (described above in conjunction with FIG. 13) to determine which channels the pager is configured to receive are active by monitoring these channels for transmissions according to the pager's protocol. If the pager does detect such transmissions, the pager is in the paging system's service area and need not change the search process. The pager would then process the detected transmission in the normal manner. On the other hand, if no transmissions with the pager's protocol are detected, the channel is assumed to be inactive and the pager proceeds to step 135 (described above in conjunction with FIG. 13) to determine whether all of the pager's channels have been scanned. If not, the pager returns to step 131. Otherwise, the pager proceeds to a step 203.

In step 203, the pager determines whether any of the channels in the search were active. If not, the pager performs a step 205 in which the pager enters the low-power mode and, in addition, increases the time the pager stays in the low-power mode before waking up and beginning a new search. For example, the pager may be configured to extend the duration by a factor of two each time the pager performs a search without detecting an active channel. The pager then returns to step 131 to start a new search. In a further refinement, the embodiment of FIG. 13 can be combined with this embodiment so that if the pager is in the service area, the pager stores the active channels and then searches the active channels only during reacquisition. However, if in step 203 active channels were detected, in a step 207 the pager enters the low-power mode for the normal duration before waking up and returning to step 131.

Figure 21:
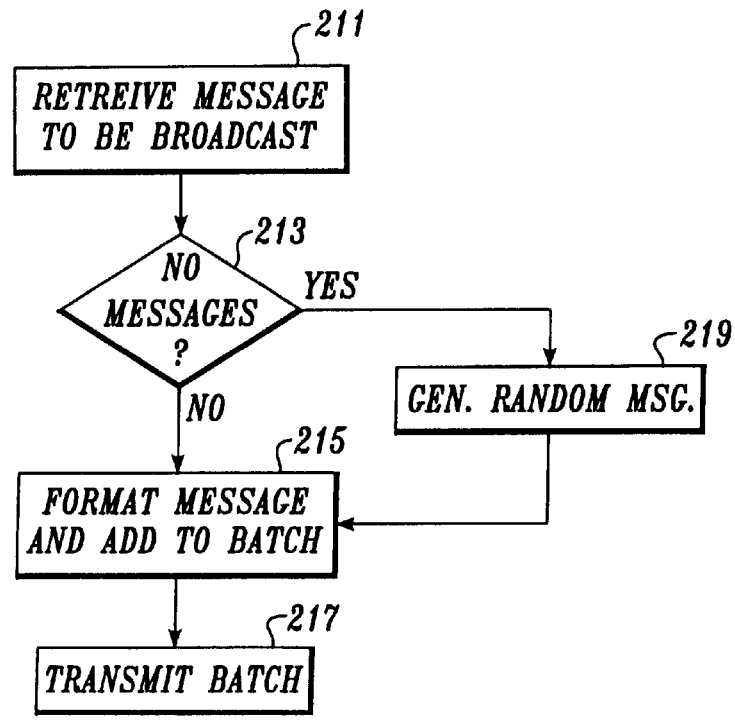
FIG. 21 is a flow diagram illustrative of a continuous transmission paging system, according to one embodiment of the present invention.

FIG. 21 is a flow diagram illustrative of a continuous transmission paging system, according to one embodiment of the present invention. This embodiment is directed toward reducing the power consumed by a pager during the acquisition process. As described above, a pager may be required to search several channels during the acquisition process, which consumes a relatively large amount of power. Further, in some situations, the paging system may become inactive. For example, in the early morning hours, there may be little or no paging activity. Thus, the paging system may not send any pages for a significant period of time, causing the pager to initiate the acquisition process and needlessly consume battery power.

Referring to FIG. 21, in this embodiment the paging system is configured to provide continuous transmission in a channel. In particular, in a step 211, the transmitter attempts to retrieve a message to be transmitted in a page. In a step 213, if there is a message, the message is formatted into a page and in a step 215, added to the batch that will be transmitted. When a batch is sufficiently filled, the batch is broadcast in a step 217. Referring back to step 213, if no messages are to be transmitted in a page in that channel, the paging system generates random or pseudo-random data in a step 219. In addition, the paging system generates an invalid or unused pager address so that a pager will not attempt to receive the randomized data. The pagers in the system can then relatively quickly reacquire the channel by receiving the HS or SI segments, thereby avoiding the need to initiate the acquisition process. In a further refinement, this embodiment can be combined with the embodiment described in conjunction with FIG. 17 to allow the pager to more quickly enter the low-power mode after reacquiring the channel. For example, when random data is to be transmitted, the paging system could set the number of pages to zero.

Figure 22:
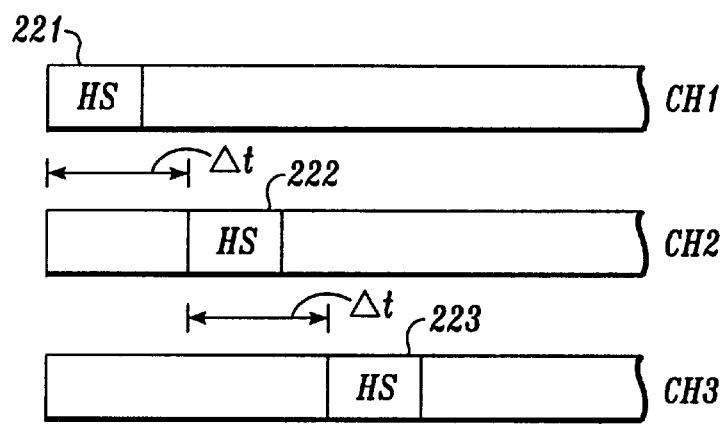
FIG. 22 is a timing diagram illustrative of channel synchronization in a paging system, according to one embodiment of the present invention.

FIG. 22 is a timing diagram illustrative of channel synchronization in a paging system that uses multiple channels for broadcasting pages, according to one embodiment of the present invention. Thus, in a paging system using three channels referred to herein as channels CH1–CH3, a pager would have to monitor at least all three of these channels. In accordance with the present invention, the paging system synchronizes the relative start times of frames in an offset manner between channels. For example, in channel CH1, the paging system may transmit an HS segment 221 (indicative of a start of a frame) at a time t. In channel CH2, the paging system may transmit an HS segment 222 at a time t+Δt. Similarly, in channel CH3 the paging system may transmit an HS segment 223 at a time t+2Δt. Preferably, the duration of time Δt is set so that, once the pager receives an HS segment in one channel, the pager can change to the next channel and immediately receive an HS segment, and so on. For example, Δt may be about 50 ms. This sequencing scheme helps minimize the time that the pager needs to search through the channels to determine active channels. In an alternative embodiment, Δt may be set to equal the time that a pager needs to receive the SI segment and change to the next channel. In this embodiment, Δt may be about 50 ms.

Figure 23:
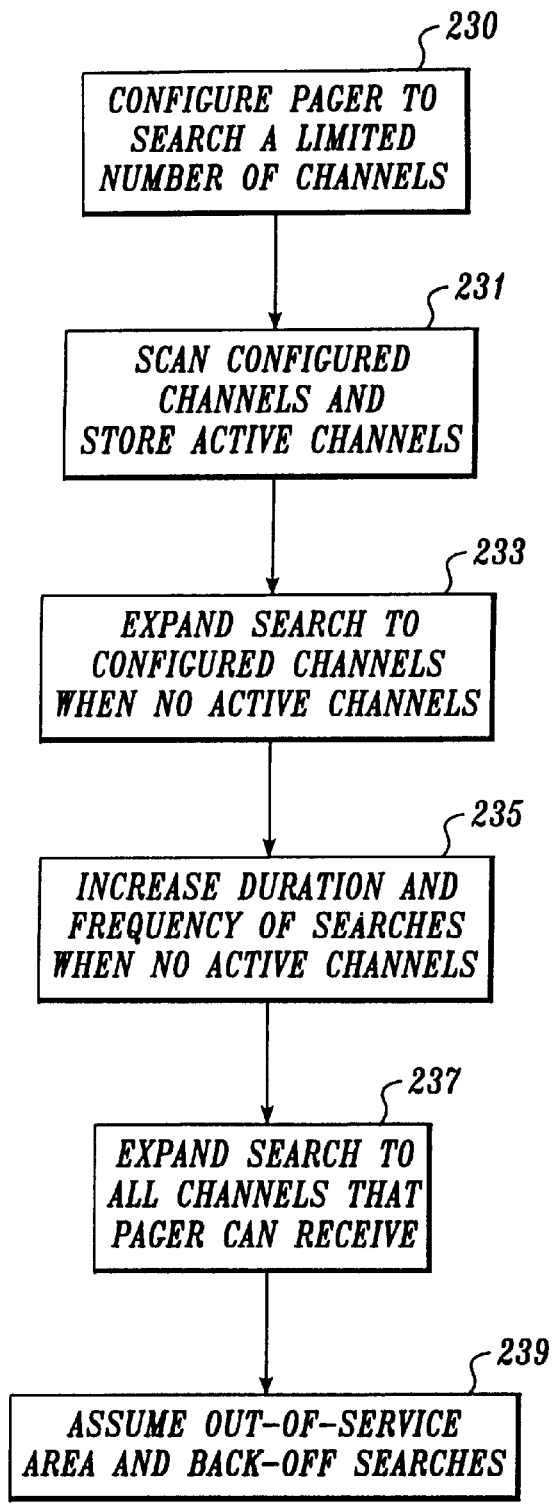
FIG. 23 is a diagram illustrative of a pager search process, according to one embodiment of the present invention.

FIG. 23 is a diagram illustrative of a pager search process, according to one embodiment of the present invention. The search is first narrowing so that the pager may save power by searching a relatively small number of the channels that the pager can receive. If the pager detects no active channels, then the pager starts widening its search. However, if the pager still cannot detect an active channel, it is assumed that the pager is out of the service area and the pager enters the low-power mode for an extended period of time to save power.

In one embodiment, in a step 230 the pager is initially configured to search only specific channels of all of the channels that the pager is capable of searching. By initially searching only a limited number of channels, the pager can conserve power. The search process can be further narrowed by searching only at predetermined time intervals as described above in conjunction with FIG. 11. In a step 231, the pager searches these configured channels and stores the channel information of the active channels. The pager would then search only these active channels in subsequent searches. In this embodiment, step 231 is performed as described above in conjunction with FIG. 13. As a result, the search process is further narrowed to save pager power.

However, if the pager detects no active channels in a predetermined time period, the pager can perform a step 233 to expand the search process. In this embodiment, the pager starts expanding the search process by searching the channels as initially configured in step 230. If the pager still detects no active channels, the pager can perform a next step 235 in which the duration of each search in a channel is increased. In addition, the frequency of the searches may be increased. For example, the predetermined time interval between searches in step 230 may be decreased so that searches are performed more often. If still no active channels are detected after a second of the predetermined time periods, the pager can perform a next step 237 to further expand or widen the search. In step 237, the pager begins searching all of the channels that the pager is capable of receiving.

However, if after another of the predetermined time periods the pager still does not detect any active channels, the pager performs a step 239. In this situation, it is assumed that the pager is no longer in the service area and, thus, will not be able to receive pages. Thus, to save power, the pager significantly increases the time between searches and enters the low-power mode in step 239. In this embodiment, step 239 is substantially similar to the process described above in conjunction with FIG. 20.

Figure 24:
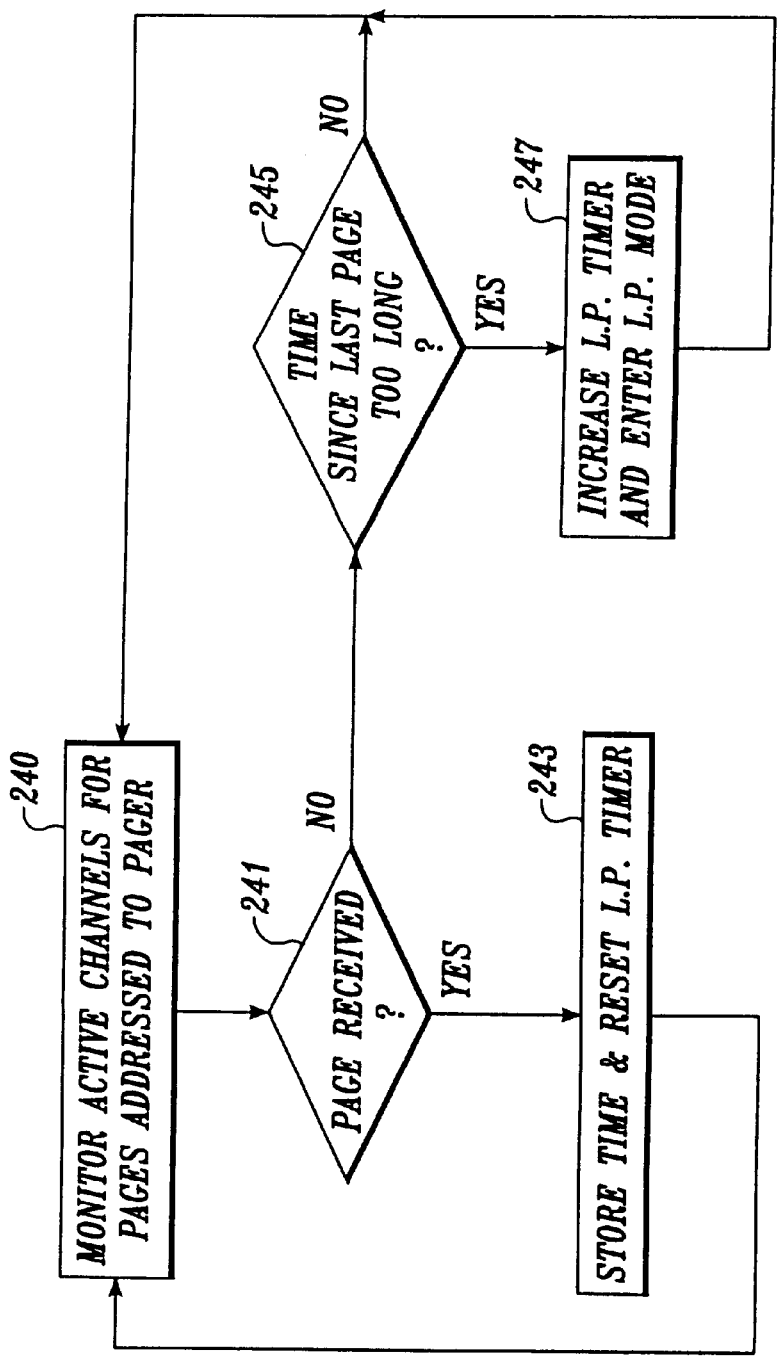
FIG. 24 is a flow diagram illustrative of an extended low-power mode for low-traffic pagers, according to one embodiment of the present invention.

FIG. 24 is a flow diagram illustrative of an extended low-power mode for low-traffic pagers, according to one embodiment of the present invention. In this embodiment, the pager and paging system are configured to keep track of the time of the last transmission to each pager. This scheme is advantageously used in cases in which the pager does not receive many pages. The pager would be configured to enter the low-power mode after receiving no pages for a predetermined time period. Thus, when the paging system has not sent a page to a particular pager in a relatively long time, the paging system will know that the pager has entered the low-power mode for an extended duration. Because the paging system knows this pager "back-off" schedule and the time of the last transmission to the pager, when a new page is to be transmitted to a particular pager, the paging system can determine the time when the pager will next perform a search and schedule the page for that time.

In particular, in one embodiment the pager performs a step 240 in which the pager monitors active channels for pages addressed to that particular pager. In a step 241 the pager determines whether a page has been received. If a page is received, the pager proceeds to a step 243 in which the pager stores the time that the page was received. The pager also resets a timer that sets how long the pager will stay in the low-power mode between searches. In this embodiment, the timer is reset to an initial default time. Of course, the pager also processes the page in the normal manner.

However, if in step 241 no page is received, the pager performs a step 245. In step 245, the pager compares the time since the last received page (or since the search began if no pages have yet been received) to a predetermined time period. This predetermined time period can encompass the time needed for the pager to complete several search cycles. For example, this time period can be initially set to 1.875 seconds and then increased by a factor of two each time the time period expires. If the time since the last page does not exceed the predetermined time period, the pager returns to step 240 to monitor the active channels. If the time since the last page exceeds the predetermined time period, the pager proceeds to a step 247 in which the pager increases the duration of the low-power mode timer by a predetermined amount and enters the low-power mode. If the pager does not receive any pages during the next search cycle, the pager will again increase the time period of the low-power mode timer so that the pager stays in the low-power mode for a longer time between searches.

The embodiments of the battery-saving techniques described above are illustrative of the principles of the present invention and are not intended to limit the invention to the particular embodiments described. For example, in light of the present disclosure, those skilled in the art of paging systems can devise other implementations of the pager using processors, protocols, and timing different from the embodiments described. Accordingly, while the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A pager for use with a paging system, the paging system being configured to transmit pages according to a plurality of protocols over a plurality of channels, the paging system being further configured to transmit pages in a plurality of page segments, the plurality of segments each having an address block and a data block separate from the address block, each address block capable of having a plurality of addresses and each data block having a plurality of data portions corresponding to the plurality of addresses in the address block, the paging system being still further configured to transmit a header synchronization (HS) segment and a system information (SI) segment, the segments being part of a frame, the pager comprising:

means for receiving an address block of a segment of a frame;

means for determining whether an address assigned to the pager is included in the address block after the address block is entirely received;

means for receiving a data block corresponding to the received address block when the address of the pager is included in the address block and for not receiving the corresponding data block when the address of the pager is not included in the received address block.

2. The pager of claim 1 wherein the HS segment includes a signal that appears to be substantially invariant with respect to frequency offset in the pager and Doppler shift in the channel, each protocol of the plurality of protocols having a unique HS segment, the pager being configured to detect whether a transmission is according to the pager's protocol by detecting whether the HS segment corresponds to the pager's protocol.

3. The pager of claim 1 wherein the paging system is configured to broadcast a frame with a predetermined number of page segments numbered 1 through N, N being an integer that can be represented in binary form with M bits, all of the addresses in the address block of each page segment being a binary number having more than M bits, all of the addresses in the address block of each page segment having the same value for M preselected bits, the M bits corresponding to the number of the page segment, the M bits being omitted from all of the addresses in the address block of each page segment.

4. The pager of claim 3 wherein the M bits are preselected to be the M lower order bits of the address and wherein N is equivalent to $2^M$.

5. The pager of claim 3 wherein the means for receiving an address block is configured to not receive segments having a segment number different from the M lowest order bits of the pager's address.

6. The pager of claim 1 wherein the paging system is further configured to transmit a page segment with the plurality of addresses of its address block being arranged in numerical order, and wherein the means for determining is configured to compare each address of the plurality of addresses in order with the address of the pager until the address matches the pager's address or is out of numerical order relative to the pager's address.

7. The pager of claim 1 wherein the paging system is further configured to transmit a page segment with information indicative of the range of addresses the address block, and wherein the means for determining is further configured to determine whether the pager's address is within the range of addresses and to cause the pager to enter a low-power mode for the remainder of the frame when the pager's address is not included in the range of addresses.

8. The pager of claim 1 wherein the paging system is further configured to transmit a page segment with the number of addresses in the address block, the means for determining being still further configured to:

cause the pager to enter the low-power mode when the number of addresses is zero;

cause the pager to receive the address or addresses of the address block when the number of addresses is less than three; and cause the pager to receive the range of addresses when the number of address is equal to or greater than three.

9. The pager of claim 1 wherein the means for determining is still further configured to perform a binary search of the addresses in the address block.

* * * * *